(12) United States Patent
Morita (10) Patent No.: US 8,174,551 B2
(45) Date of Patent: May 8, 2012

(54) IMAGE FORMING APPARATUS AND IMAGE FORMING METHOD WHICH UTILIZES A TRAPPING PROCESS

(75) Inventor: Seijiro Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 447 days.

(21) Appl. No.: 12/484,087

(22) Filed: Jun. 12, 2009

(65) Prior Publication Data

US 2009/0315968 A1 Dec. 24, 2009

(30) Foreign Application Priority Data

Jun. 24, 2008 (JP) ................................. 2008-165076

(51) Int. Cl.
*B41J 2/435* (2006.01)
(52) U.S. Cl. ...................................................... 347/224
(58) Field of Classification Search ............... 347/248, 347/224; 358/3.03
See application file for complete search history.

(56) References Cited

U.S. PATENT DOCUMENTS

2008/0112012 A1* 5/2008 Yokoyama et al. .......... 358/3.03

FOREIGN PATENT DOCUMENTS

| JP | 2002-116394 A | 4/2002 |
| JP | 2003-241131 A | 8/2003 |
| JP | 2007-221226 A | 8/2007 |

* cited by examiner

*Primary Examiner* — Stephen Meier
*Assistant Examiner* — Carlos A Martinez
(74) *Attorney, Agent, or Firm* — Canon USA Inc IP Division (57) ABSTRACT

Curve information is set in accordance with curving of a scanning line that occurs when an image is formed. A value of a target pixel is corrected on the basis of image data that is provided in a reference window having the target pixel and peripheral pixels, thereby transforming a region having a color of a specified image. The reference window that is used in the transformation is corrected in accordance with the curve information with respect to a main scanning position for pixels that are to be processed.

4 Claims, 11 Drawing Sheets

M PLATE
(AFTER TRAPPING IS PERFORMED)

IMAGE FORMING APPARATUS AND IMAGE FORMING METHOD WHICH UTILIZES A TRAPPING PROCESS

BACKGROUND OF THE INVENTION

1. Field of the Invention

The present invention relates to an image forming apparatus for correcting a trapping width for curving of a scanning line that occurs when an image is formed and for performing a trapping process, and to a method for performing a trapping process with the image forming apparatus.

2. Description of the Related Art

Recently, in order to increase the speed of image formation in electrophotographic color image forming apparatuses (laser printers), a tandem electrophotographic method has been employed in most cases. In this method, developing devices and photosensitive drums are arranged, the number of developing devices and the number of photosensitive drums being the same as the number of color materials (toners). Images having different colors are sequentially transferred onto a conveying belt or a recording sheet, thereby forming a color image. In such a tandem color image forming apparatus, because images having different colors are formed by image forming units that correspond to the colors, a shift between color plates may occur in terms of the images having different colors. Because of such a shift between color plates, a white region may appear between an image portion having a certain color and an image portion having a different color, or a portion in which a specific color is more conspicuous because of an overlap between an image portion having a certain color and an image portion having a different color may appear.

Furthermore, as factors responsible for such a shift between color plates, nonuniformity among lenses, each of which is provided in a deflection scanner that performs deflection scanning with laser light to form a latent image, a shift of a position at which the lens is mounted, a shift of a position at which the deflection scanner is installed in a body of the image forming apparatus, and so forth can be considered. In the case of such an occurrence, inclining or curving of a scanning line of laser light occurs. Additionally, because the degree of inclination or curving of a scanning line differs for each color, a shift between plates appears as a result.

Various methods for dealing with such a shift between color plates have been proposed.

In Japanese Patent Laid-Open No, 2002-116394, the degree of curving of a scanning line in a deflection scanner is measured using an optical sensor in a process of assembling the deflection scanner. The curvature of the scanning line is adjusted by rotating a lens in a mechanical manner in accordance with a result of measurement, and then, the lens or the like is fixed using an adhesive.

Furthermore, in Japanese Patent Laid-Open No, 2003-241131, the degree of inclination of a scanning line is measured using an optical sensor when a deflection scanner is installed in a body of a color image forming apparatus. The inclination of the scanning line is adjusted by inclining the deflection scanner in a mechanical manner in accordance with the degree of the inclination. After the inclination of the scanning line is adjusted in this manner, the deflection scanner is installed in the color image forming apparatus, and fixed.

In addition to the method for dealing with such a shift between color plates, which requires mechanical adjustment or an adjustment process in assembly as disclosed in Japanese Patent Laid-Open No, 2002-116394 or No, 2003-241131, a trapping technique has been known. The trapping technique involves setting of, at a boundary between two adjacent objects having different colors, a portion in which the objects slightly overlap each other (hereinafter, referred to as "trapping").

Moreover, in order to optimally perform trapping, it is necessary that a trapping width be set to be large at a position at which a large white region appears, and that the trapping width be set to be small at a position at which an overlap between color images appears.

As a method for performing an appropriate trapping process, Japanese Patent Laid-Open No, 2007-221226 discloses the following method: a sheet is divided into a plurality of division regions in advance; an amount of a shift between plates that appears for each of the division regions is obtained; trapping characteristic data is obtained in accordance with the amount of a shift between plates for each of the division regions; and a trapping width that is determined from the obtained trapping characteristic data is applied for trapping.

Figure 6:
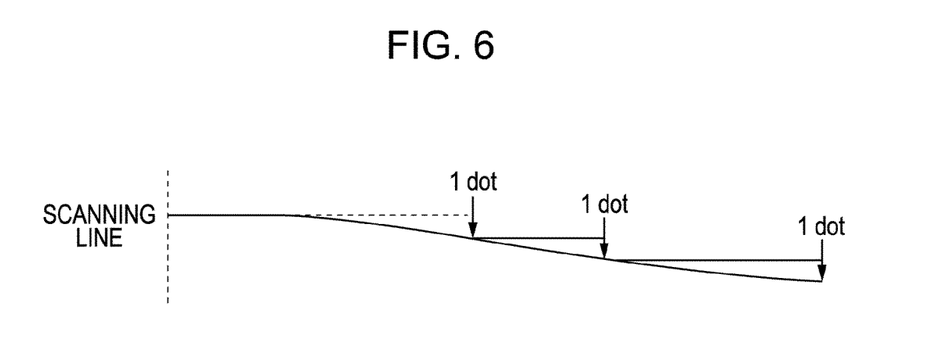
FIG. 6 is an illustration for explaining curving of a scanning line of laser light in the embodiment of the present invention.
Figure 7:
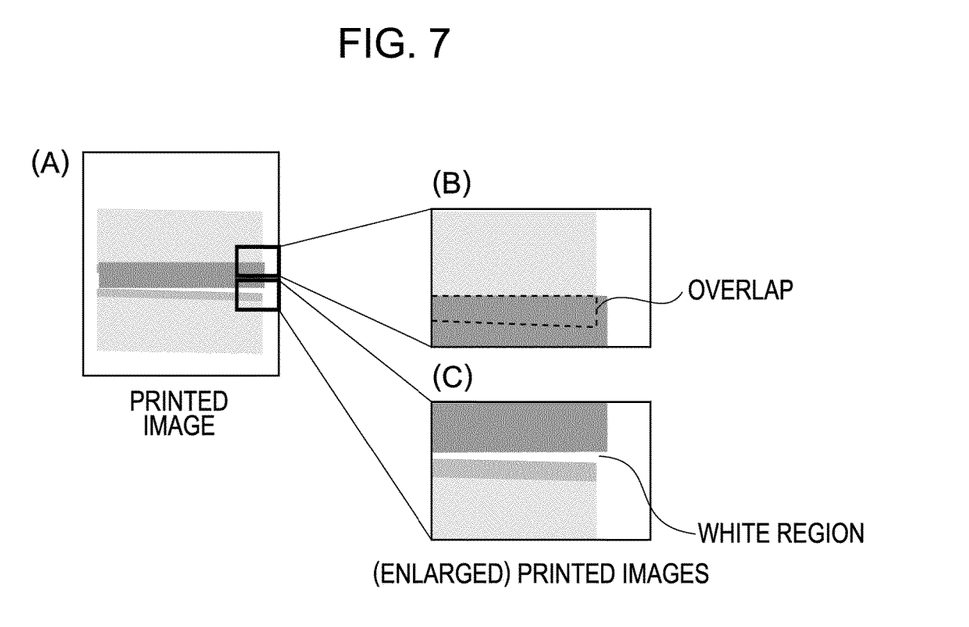
FIG. 7 includes illustrations for explaining correction using trapping for curving of a scanning line of laser light in the embodiment of the present invention.

The degree of inclining or curving of a scanning line of laser light differs for each color. When a scanning line of laser light that is used to generate a plate having a color is curved, depending on curving of the scanning line of laser light for a color for which trapping is to be performed, different trapping widths, e.g., a trapping width for a case in which trapping is performed with upward growth and a trapping width for a case in which trapping is performed with downward growth, may be necessary. Herein, trapping with upward growth indicates increasing of a region in which toner having a certain color is fixed so that an adjacent region in which toner having a different color is fixed overlaps the region in which toner having a certain color is fixed in a sub-scanning direction. Furthermore, increasing of a region in which toner having a certain color is fixed so that an adjacent region in which toner having a different color is fixed overlaps the region in which toner having a certain color is fixed in a direction that is opposite to the sub-scanning direction is called trapping for downward growth. For example, as shown in FIG. 6, it is supposed that a region having a certain color and a region having a different color exist, which are adjacent to each other, and that trapping is performed for the region having a different color. With respect to a curved scanning line of laser light for the certain color, a scanning line of laser light for the different color is curved in the sub scanning direction (the downward direction) as the scanning line of laser light for the different color extends in a main scanning direction. In this case, as shown in FIG. 7, the necessary trapping width for upward growth is decreased in the main scanning direction (the right direction), and appearance of a white spot cannot be prevented with the trapping width for upward growth. The necessary trapping width for downward growth is increased, so that the trapping width for downward growth is larger than necessary. Note that, in this case, an image portion having a dark color shown in part (A) of FIG. 7 is formed using laser light for a certain color that is a criterion. Image portions that are shown in part (A) of FIG. 7 and that sandwich the image portion having a dark color are formed using laser light for a different color.

In the method disclosed in Japanese Patent Laid-Open No, 2007-221226, in accordance with information concerning a shift between plates, which is obtained for each region, trapping is performed with a fixed trapping width at a color boundary that is found in the region. Accordingly, different trapping widths, e.g., a trapping width for upward growth and a trapping width for downward growth, cannot be set. Thus, the trapping width that is larger than necessary is set, and this leads to reduction in trapping quality.

SUMMARY OF THE INVENTION

The present invention provides an image forming apparatus for forming an image using a plurality of toners. The image forming apparatus includes the following elements: a setting unit configured to set curve information in accordance with curving of a scanning line of laser light that occurs when an image is formed; an image transformation processing unit configured to transform an image by generating a trapping image, the trapping image being generated by correcting a value of a target pixel on the basis of image data that is provided in a reference window having the target pixel and peripheral pixels; and a reference-window correction unit configured to correct the reference window in accordance with the curve information with respect to a main scanning position for pixels that are to be processed by the image transformation processing unit.

Further features of the present invention will become apparent from the following description of exemplary embodiments with reference to the attached drawings.

DESCRIPTION OF THE EMBODIMENTS

Embodiments of the present invention will be described below with reference to the accompanying drawings. The present invention is not limited to any of the embodiments described below, and not all of the combinations of features described in the following embodiments are essential in means for solving the problems according to the present invention.

Figure 1:
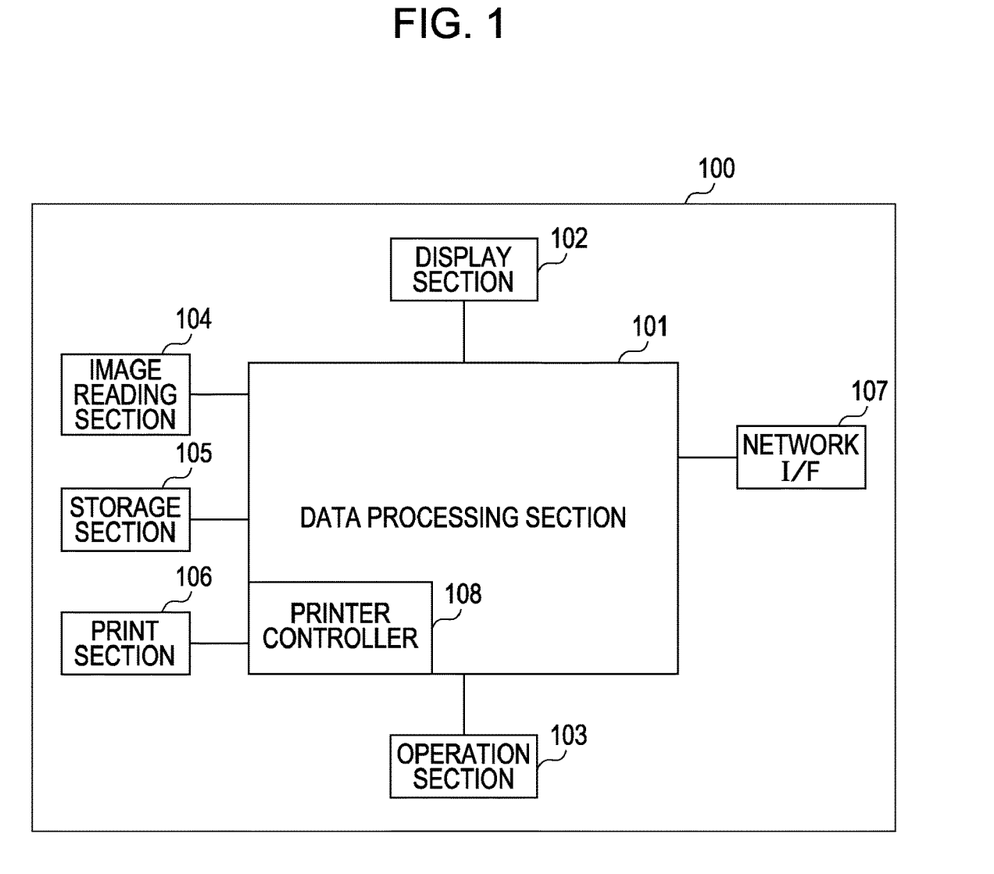
FIG. 1 is a block diagram for explaining a configuration of a color image forming apparatus (a multifunction apparatus) according to an embodiment of the present invention.

FIG. 1 is a block diagram for explaining a configuration of a color image forming apparatus (a multifunction apparatus) according to an embodiment of the present invention.

The image forming apparatus 100 is realized, for example, using a multifunction peripheral (MFP) apparatus that is a multifunction apparatus which realizes a plurality of types of functions. Furthermore, the image forming apparatus 100 is connected to a network via a network interface (I/F) 107, and can send and receive image data and various types of information using the network between the image forming apparatus 100 and an external apparatus that is connected to the network.

Referring to FIG. 1, an image reading section 104 including a document plate and an auto document feeder (ADF) irradiates an image of an original document, which consists of several sheets or a sheet, with light from a light source on the document plate. The image reading section 104 forms a reflected image using light reflected by the original document on solid-state image-pickup elements (not illustrated) with a lens, whereby the image reading section 104 can obtain a raster image having a predetermined density (for example 600 dpi) for each page in accordance with raster image signals that are supplied from the solid-state image-pickup elements. Additionally, in the present embodiment, a paper document is used as an example of the original document that is to be read by the image reading section 104 in a description given below. However, a print document such as a recording medium other than paper (for example, an overhead projector (OHP) sheet, a transparent original document such as a film, cloth, or the like) may be used as an object to be read by the image reading section 104.

Furthermore, the image forming apparatus 100 has a copy function of printing, with a print section 106 on a recording medium, an image corresponding to the image signals that are read by the image reading section 104. More specifically, when making a copy of the original document is performed, image processing is performed on the image signals by a data processing section 101 to generate print data. The print data is output to the print section 106, and is printed on a recording medium by the print section 106. When making copies of the original document is performed, the print data is temporarily stored in a storage section 105 such as a hard disk (HD). Then, outputting of the print data to the print section 106 is repeatedly performed at times corresponding to a specified number of copies, and the print data is printed on recording media by the print section 106. Moreover, various types of print control using the print section 106 are realized by a printer controller 108. The print section 106 includes, for example, a printer engine of a tandem laser printer in the present embodiment.

Figure 13:
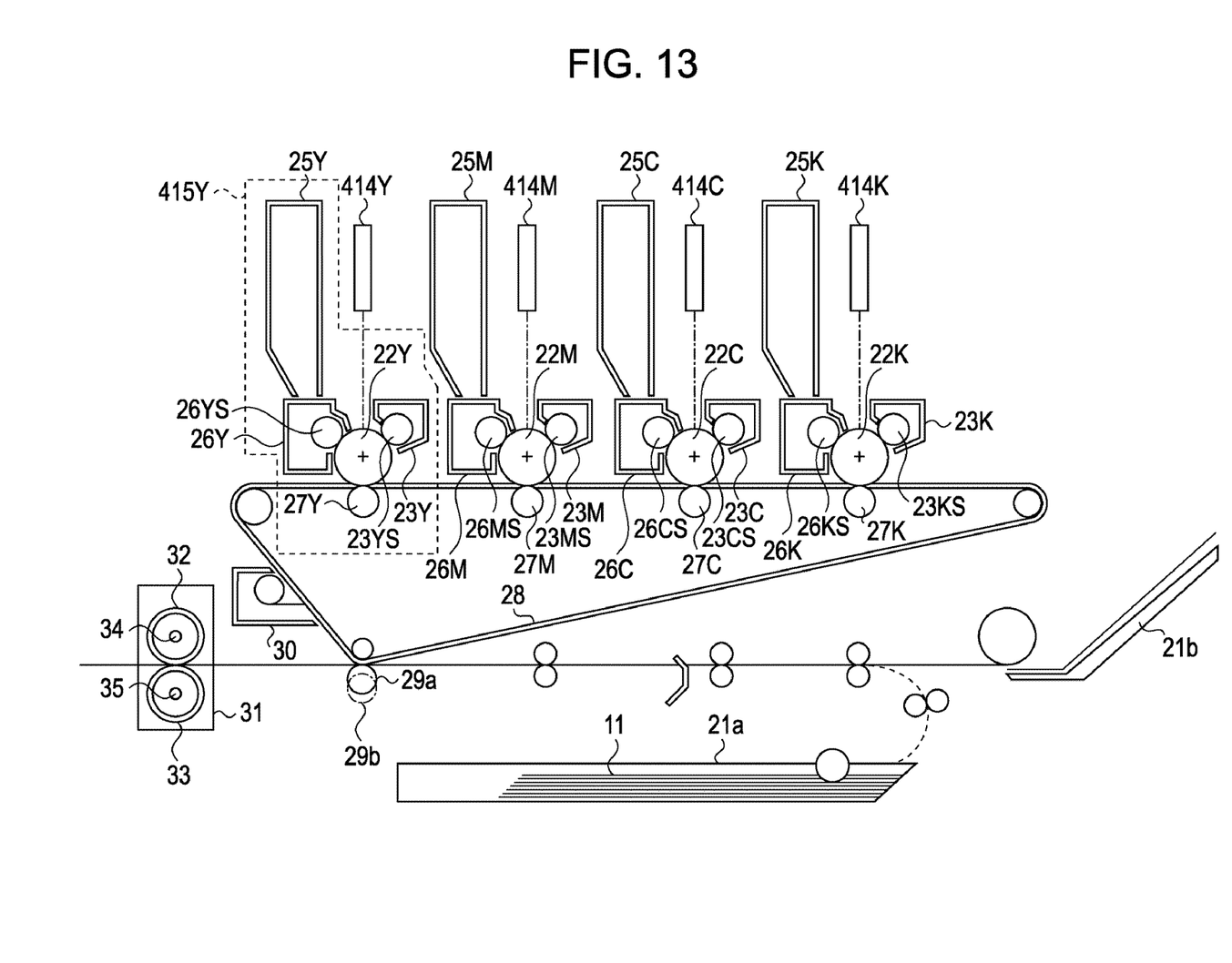
FIG. 13 is a diagram showing an example of an electrophotographic laser printer in the embodiment.

FIG. 13 is a sectional view of the tandem print section 106 which is one example of an electrophotographic laser printer and in which an intermediate transfer member 28 is employed. An operation of the print section 106 in the electrophotographic color image forming apparatus 100 will be described with reference to FIG. 13. In the print section 106, exposure light is emitted for an exposure time that is provided in accordance with recorded data which is processed by the printer controller 108, and electrostatic latent images are formed on photosensitive drums, i.e., image bearing members. The electrostatic latent images are developed, thereby forming monochrome toner images for corresponding color components. The monochrome toner images are superimposed on one another on the intermediate transfer member 28, thereby forming a multicolor toner image. The multicolor toner image is transferred onto a print medium 11, and is fixed by being heated. The intermediate transfer member 28 is also an image bearing member. Charging units include four filling chargers 23Y, 23M, 23C, and 23K for charging photosensitive members 22Y, 22M, 22C, and 22K for corresponding colors Y, M, C, and K, respectively. Sleeves 23YS, 23MS, 23CS, and 23KS are provided in the filling chargers 23Y, 23M, 23C, and 23K, respectively.

The image bearing members, i.e., the photosensitive members (photosensitive drums) 22Y, 22M, 22C, and 22K, are rotated by a drive motor in a counterclockwise direction in accordance with an image forming operation. Scanner units 414Y, 414M, 414C, and 414K, which are exposure units, irradiate the photosensitive members 22Y, 22M, 22C, and 22K with the exposure light, thereby selectively exposing surfaces of the photosensitive members 22Y, 22M, 22C, and 22K, respectively. As a result, electrostatic latent images are formed on the surfaces of the photosensitive members 22Y, 22M, 22C, and 22K. Developing devices 26Y, 26M, 26C, and 26K, which are developing units, develop the electrostatic latent images with toner for the corresponding colors Y, M, C, and K in order to visualize the electrostatic latent images. Sleeves 26YS, 26MS, 26CS, and 26KS are provided in the developing devices 26Y, 26M, 26C, and 26K, respectively. Note that each of the developing devices 26Y, 26M, 26C, and 26K can be detachably attached. The scanner units 414Y, 414M, 414C, and 414K can achieve a gray-scale expression for each pixel using the width or intensity of a laser beam.

Primary transfer rollers 27Y, 27M, 27C, and 27K, which are transfer units, press the intermediate transfer member 28, which is rotated in a clockwise direction, onto the photosensitive members 22Y, 22M, 22C, and 22K, thereby transferring, onto the intermediate transfer member 28, the monochrome toner images that are formed on the photosensitive members 22Y, 22M, 22C, and 22K. By applying an appropriate bias voltage to the primary transfer rollers 27Y, 27M, 27C, and 27K and by generating differences between rotational speeds of the photosensitive members 22Y, 22M, 22C, and 22K and a rotational speed of the intermediate transfer member 28, the monochrome toner images are efficiently transferred onto the intermediate transfer member 28. This is called primary transfer.

The multicolor toner image is obtained by superimposing the monochrome toner images for corresponding stations (as which image forming units for the corresponding color components are referred to in some cases) on one another, and is conveyed to a secondary transfer roller 29 in accordance with rotation of the intermediate transfer member 28. The multicolor toner image formed on the intermediate transfer member 28 is transferred onto the print medium 11 which is conveyed from a sheet feeding tray 21a to the secondary transfer roller 29 while being nipped. An appropriate bias voltage is applied to the secondary transfer roller 29, thereby electrostatically transferring the multicolor toner image onto the print medium 11. This is called secondary transfer. The secondary transfer roller 29 is in contact with the print medium 11 at a position 29a while the multicolor toner image is being transferred onto the print medium 11. After a printing process is performed, the secondary transfer roller 29 is located at a position 29b to be separated from the print medium 11.

In order to fix the multicolor toner image, which has been transferred onto the print medium 11, on the print medium 11 by heating and fusing, a fixing unit 31 includes a fixing roller 32 that heats the print medium 11, and a pressure roller 33 for pressing the print medium 11 against the fixing roller 32. The fixing roller 32 and the pressure roller 33 are formed as hollow rollers. A heater 34 and a heater 35 are embedded in the fixing roller 32 and the pressure roller 33, respectively. The fixing unit 31 conveys the print medium 11 that holds the multicolor toner image using the fixing roller 32 and the pressure roller 33, and also applies heat and pressure to the print medium 11 to fix the toner on the print medium 11.

Then, the print medium 11, on which the toner has been fixed, is output to a sheet output tray (not illustrated) by a sheet output roller (not illustrated), and the image forming operation is completed. A cleaning unit 30 cleans off residual toner on the intermediate transfer member 28. Waste toner remaining after the multicolor toner image having four colors that has been formed on the intermediate transfer member 28 has been transferred onto the recording medium 11 is accumulated in a cleaner container. As described above, the tandem color laser printer includes the image forming units that include the printing units 415Y, 415M, 415C, and 415K and the scanner units 414Y, 414M, 414C, and 414K for the corresponding color components. An operator issues an instruction to the image forming apparatus 100 using an operation section 103 that is included in the image forming apparatus 100. The above-described series of operations is controlled by a control unit (a central processing unit (CPU) 208 shown in FIG. 2) that is provided in the data processing section 101. Furthermore, an input state of the operation section 103 and image data that is being processed are displayed on a display section 102. Additionally, in the image forming apparatus 100, a user interface for providing, to a user, various types of operations and displays that are used to perform various types of processes which are described below is realized using the display section 102 and the operation section 103.

Figure 2:
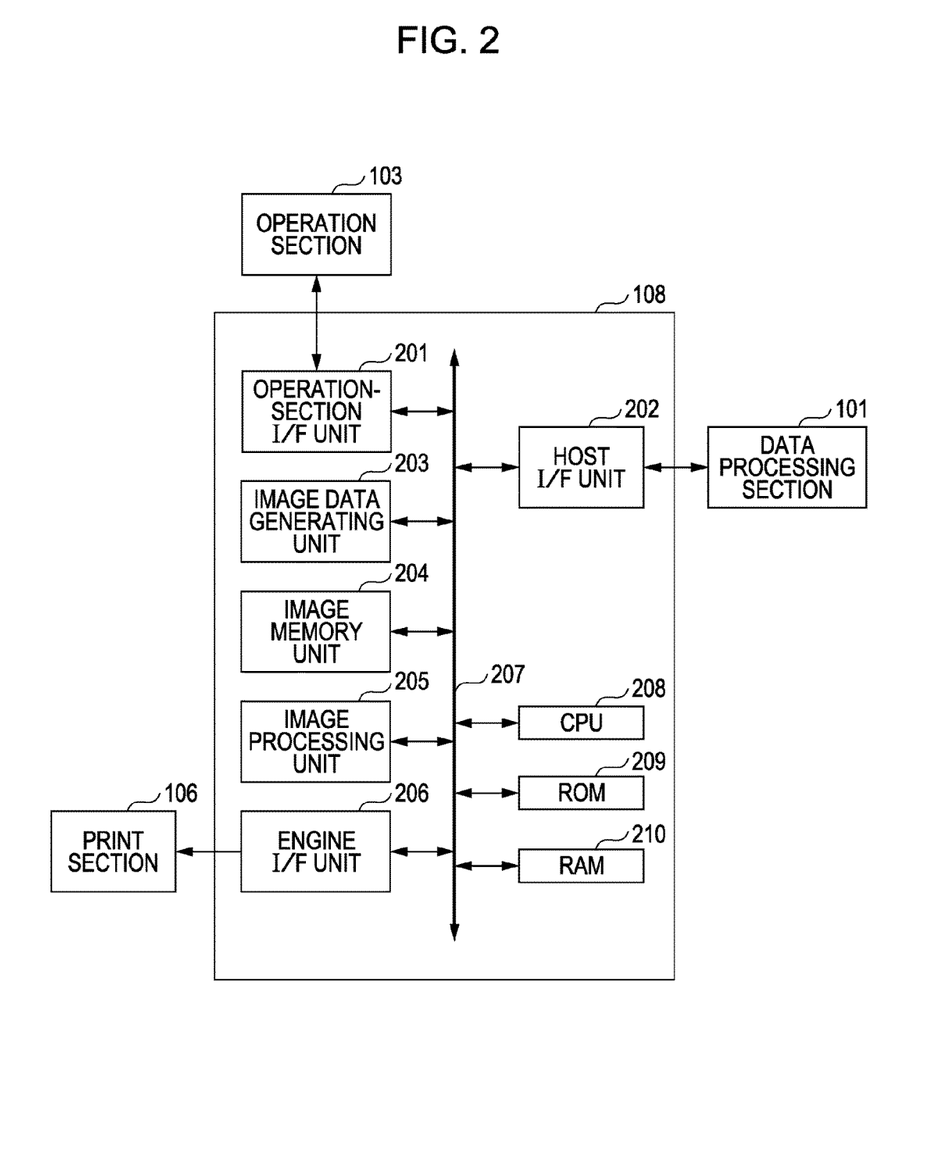
FIG. 2 is a block diagram showing a detailed configuration of a printer controller in the embodiment of the present invention.

Next, a detailed configuration of the printer controller 108 will be described below with reference to FIG. 2. FIG. 2 is a block diagram showing the detailed configuration of the printer controller 108 in the embodiment of the present invention.

The printer controller 108 includes a host I/F unit 202. In the host I/F unit 202, an input buffer (not illustrated), to which print data that is sent from the data processing section 101 or a setting for specifying an operation of the image forming apparatus 100 is input, is provided. Furthermore, in the host I/F unit 202, an output buffer (not illustrated) that temporarily holds a signal or output data including device information data, which are to be sent to the data processing section 101, is provided. Additionally, the host I/F unit 202 is configured as an input/output section for a signal or a communication packet, which are sent or received between the printer controller 108 and the data processing section 101, and also controls communication between the printer controller 108 and the data processing section 101.

Print data that is input via the host I/F unit 202 is supplied to an image data generating unit 203. Herein, the input print data is configured, for example, using page description language (PDL) data. The image data generating unit 203 performs analysis (for example, a PDL analysis process) on the input print data with a predetermined analyzer. The image data generating unit 203 generates an intermediate language using a result of analysis, and further generates bitmap data that can be processed by the image processing unit 205.

More specifically, the image data generating unit 203 performs analysis of the print data and generation of intermediate language information using the analysis. The image data generating unit 203 also performs a rasterizing process simultaneously with the generation of intermediate language information. The rasterizing process involves conversion from display colors RGB (for additive mixture), which are used in the print data, to YMCK (for subtractive mixture), which can be processed by the print section 106. The rasterizing process also involves, for example, a process of converting character code, which is included in the print data, to font data using bit pattern, outline font, or the like, which are stored in advance. Then, in the rasterizing process, bitmap data is generated for each page or for each band, thereby generating bitmap data that can be subjected to a printing process by the image processing unit 205. The bitmap data that is generated in this manner is stored in an image memory unit 204. Next, the bitmap data that is read from the image memory unit 204 is subjected to a process of transforming an image or a pseudo-gray-scale process using a dither pattern by the image processing unit 205, and half-tone data that can be subjected to a printing process by the print section 106 is generated. The generated half-tone data is stored in the image memory unit 204. Herein, for example, a trapping process is performed as the process of transforming an image.

The half-tone data that is read from the image memory unit 204 is transferred as a vide signal to the print section 106 via an engine I/F unit 206. In the engine I/F unit 206, an output buffer (not illustrated) that temporarily holds recorded data (the video signal) which is to be transferred to the print section 106, and an input buffer (not illustrated) that temporarily holds a signal which is sent from the print section 106 are provided. Furthermore, the engine I/F unit 206 is configured as an input/output unit for a signal that is sent or received between the printer controller 108 and the print section 106, and also controls communication between the printer controller 108 and the print section 106.

Moreover, various types of instructions including an instruction that is provided using an operation which is input to the operation section 103 by the user and that is related to a mode setting, and so forth are input via an operation-section I/F unit 201. The operation-section I/F unit 201 is configured as an interface between the operation section 103 and the CPU 208. The CPU 208 controls each of the above-described units in accordance with a mode that is set using an instruction which is provided from the operation section 103 or the data processing section 101. The control is performed by the CPU 208 in accordance with a control program that is stored in a read-only memory (ROM) 209. The control program that is stored in the ROM 209 includes an operation system (OS) for performing time-division control in units of load modules, which are referred to as "tasks", in accordance with a system clock. The control program also includes a plurality of load modules that are executed and controlled on a function-by-function basis by the OS. A random-access memory (RAM) 210 is used as a working area for arithmetic processing that is performed by the CPU 208. Each of the units including the CPU 208 is connected to a system bus 207. The system bus 207 includes an address bus, a data bus, and a control-signal bus.

Next, a detailed configuration of the image processing unit 205 will be described with reference to FIG. 3.

Figure 3:
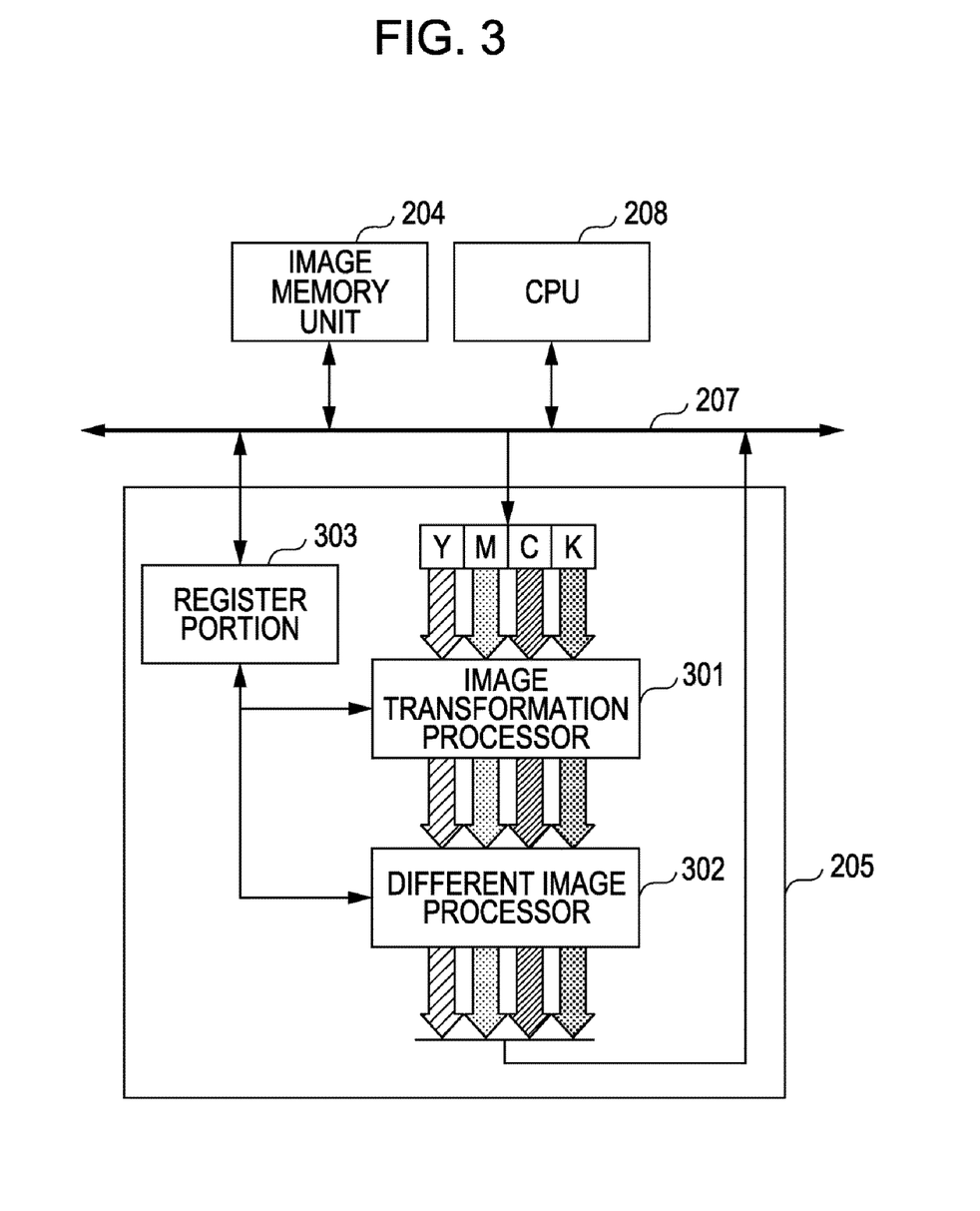
FIG. 3 is a block diagram showing a detailed configuration of an image processing unit of the printer controller in the embodiment of the present invention.

FIG. 3 is a block diagram showing the configuration of the image processing unit 205 of the printer controller 108 in the embodiment of the present invention.

A register portion 303 includes a plurality of registers (not illustrated). The CPU 208 writes an appropriate value into each of the registers of the register portion 303, whereby the CPU 208 sets a setting for the image processing unit 205.

An image transformation processor 301 performs, on the bitmap data that is read from the image memory unit 204, a process of changing the shape of an image for each plate in accordance with the respective registers of the register portion 303, i.e., an image transformation process. Furthermore, curve information concerning curving of a scanning line of laser light for each of the colors (CMYK) that are necessary for the image transformation process is stored in the RAM 210 or the ROM 209. The curve information can be read and used under control that is performed by the CPU 208. Next, for example, a gamma correction process or the pseudo-gray-scale process using a dither pattern is performed by a different image processor 302 using the bitmap data that is processed by the image transformation processor 301, thereby generating the half-tone data. The half-tone data that is generated by the image processing unit 205 is sent to the image memory unit 204 via the system bus 207.

Next, reduction in image quality that is caused by inclining or curving of a scanning line of laser light which is influenced by accuracy with which each of the exposure units is mounted will be described with reference to FIGS. 4 to 7.

Figure 4:
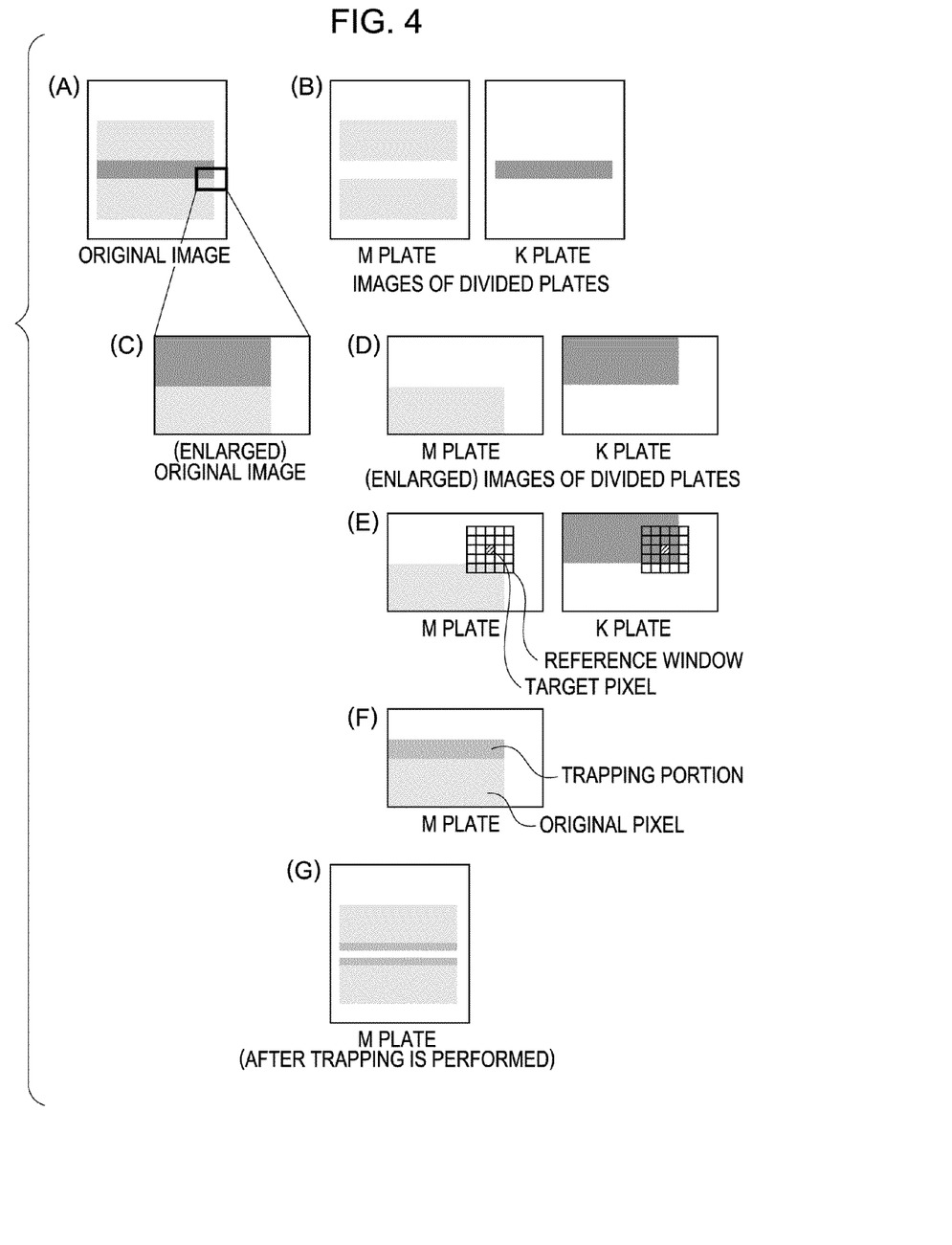
FIG. 4 includes illustrations for explaining a trapping process in the embodiment of the present invention.

Parts (A) to (G) of FIG. 4 are illustrations for explaining the image transformation process.

Part (A) of FIG. 4 is an illustration showing bitmap data corresponding to one page before the image transformation process is performed. Part (B) of FIG. 4 includes illustrations showing images that are obtained by performing plate division on the bitmap data shown in part (A) of FIG. 4. Parts (C) and (D) of FIG. 4 are illustrations in which portions of parts (A) and (B) of FIG. 4 are enlarged, respectively.

Figure 5:
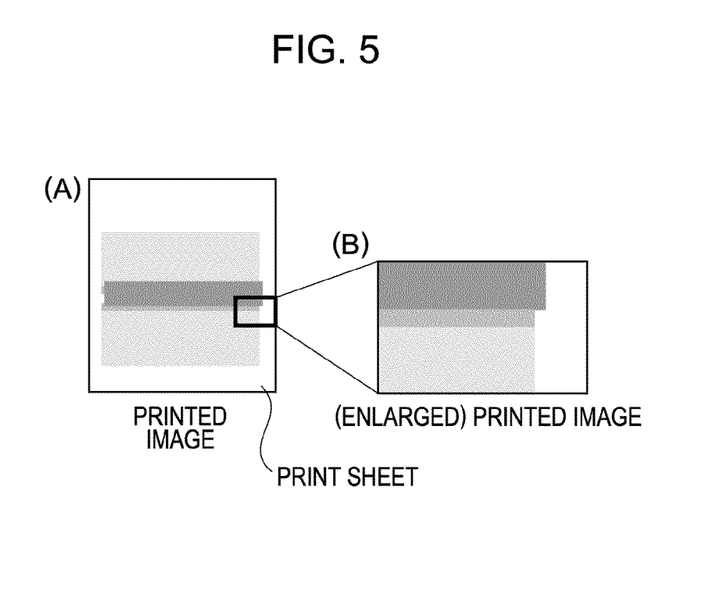
FIG. 5 includes illustrations for explaining the trapping process in the embodiment of the present invention.

Part (E) of FIG. 4 is an illustration for explaining the trapping process for the images that are obtained by performing plate division. First, when an M plate is one of two plates that are obtained by performing plate division and a K plate is the other plate, whether or not a value of a target pixel of the image of the M plate is equal to or lower than a set threshold, and whether or not a value of a pixel, which is located at a position that is the same as the position of the target pixel of the image of the M plate, of the image of the K plate is equal to or higher than the specified threshold are determined. As a result, whether or not the target pixel is located at a boundary portion between the images, which have colors whose densities are different to some degree from each other, of the plates, as in the case in which the target pixel is located at a position shown in part (E) of FIG. 4, can be determined. Next, search of a reference window whose center is the target pixel on the M plate is performed in order to determine whether or not pixels having values that are equal to or higher than the specified threshold exist in the reference window. As a result of performing search of the reference window as mentioned above, when no pixel having a value that is equal to or higher than the specified threshold is found, the trapping process for the target pixel is terminated, and the target pixel moves to a pixel that is adjacent in a main scanning direction. When pixels having values that are equal to or higher than the specified threshold are found, it is determined that the target pixel is located at a color boundary between the images, and the minimum value among values of the found pixels is provided to the target pixel. After that, the target pixel moves to a pixel that is adjacent in the main scanning direction. The above-mentioned process are repeated while the target pixel is being moved to an adjacent pixel, whereby the trapping process can be performed for a width corresponding to the reference window whose center is the target pixel. Parts (A) and (B) of FIG. 5 are illustrations showing an example in which the K plate is shifted from the M plate. As described above, the trapping process is performed on the bitmap data, whereby appearance of a white region between the image of the M plate and the image of the K plate can be suppressed even when a shift between the M and N plates occurs. Note that the target pixel is not necessarily located at the center of the reference window, and it is only necessary that the target pixel be included in the reference window.

Next, FIG. 6 is an illustration for explaining curving of a scanning line of laser light. In FIG. 6, the horizontal axis represents the main scanning direction of the scanning line, and the vertical axis represents a sub-scanning direction. The scanning line with which printing should be performed is a straight line.

Figure 8:
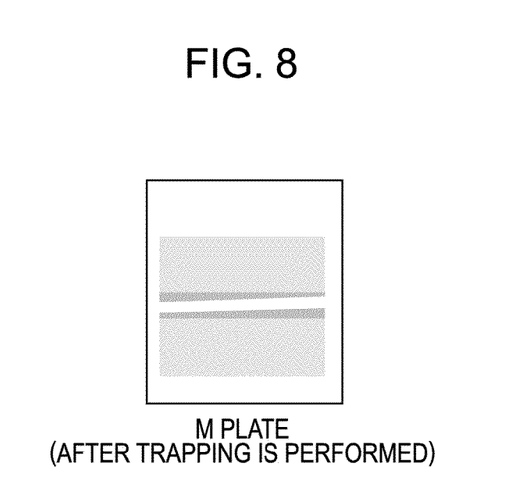
FIG. 8 is an illustration for explaining a result of the trapping process in the embodiment of the present invention.

FIG. 7 includes illustrations showing an image that was printed by a printer engine in which curving of a scanning line of laser light occurs. Part (A) of FIG. 7 is an illustration showing a printed image that was obtained when a scanning line of laser light for the M plate is curved as shown in FIG. 6. Parts (B) and (C) of FIG. 7 are illustrations in which portions of part (A) of FIG. 7 are enlarged. Because the scanning line of laser light is curved on the M plate with respect to the scanning line with which printing should be performed, an overlap between the M plate and the N plate, which should not exist, is increased by an influence of curving of the scanning line as shown in part (B) of FIG. 7. Furthermore, referring to part (C) of FIG. 7, a white region appears although the trapping process has been performed. FIG. 8 illustrates a state in which a trapping width has been changed so as to be suitable for the curvature of the scanning line.

Figure 9:
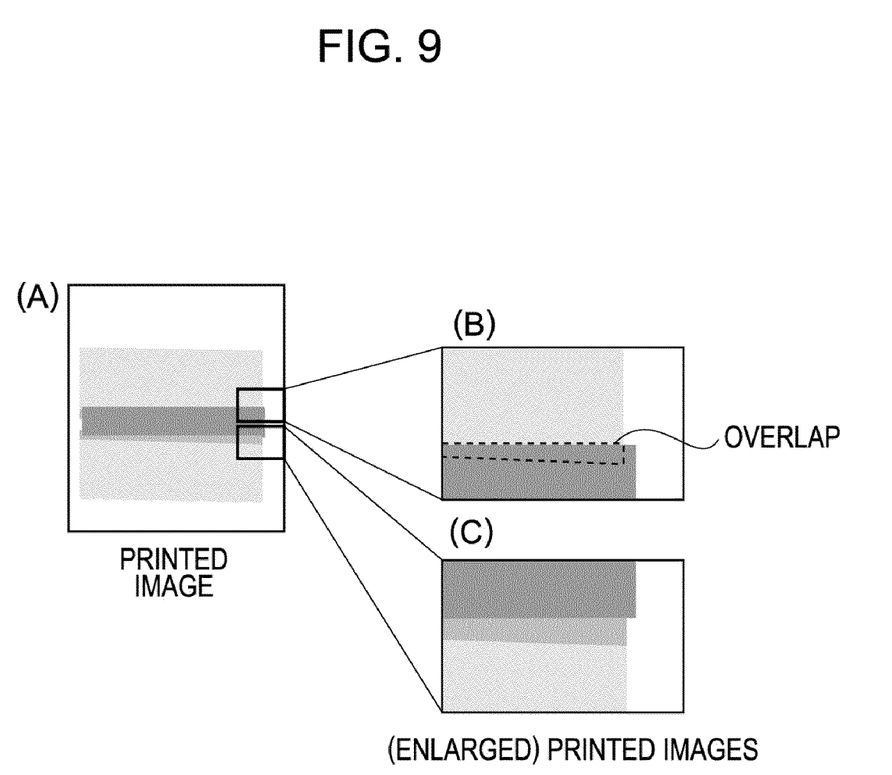
FIG. 9 includes illustrations for explaining the result of the trapping process in the embodiment of the present invention.

More specifically, for a portion in which the scanning line of laser light on the plate that is to be subjected to the trapping process is curved in a + (positive) direction, a trapping width for trapping in a direction toward the top edge of a color boundary, i.e., a trapping width for upward growth, is increased. Furthermore, a trapping width for trapping in a direction toward the bottom edge of the color boundary, i.e., a trapping width for downward growth, is decreased. For a portion in which the scanning line of laser light is curved in a − (negative) direction, the trapping width for upward growth is decreased, and the trapping width for downward growth is increased. Herein, the + (positive) direction is the sub-scanning direction, i.e., a direction toward the bottom edge of the printed image. The − (negative) direction is a direction that is opposite to the sub-scanning direction, i.e., a direction toward the top edge of the printed image. Parts (A) to (C) of FIG. 9 are illustrations showing a state in which an appropriate result of trapping can be obtained by changing the trapping widths in accordance with the curvature of the scanning line even when curving of the scanning line occurs in the printer engine.

The image transformation processor 301 in the embodiment of the present invention corrects the size of the reference window in order to change the trapping widths in accordance with the curvature of the scanning line.

Next, a process that is performed by the image transformation processor 301 in the embodiment of the present invention will be described with reference to FIGS. 10 to 12.

Figure 10:
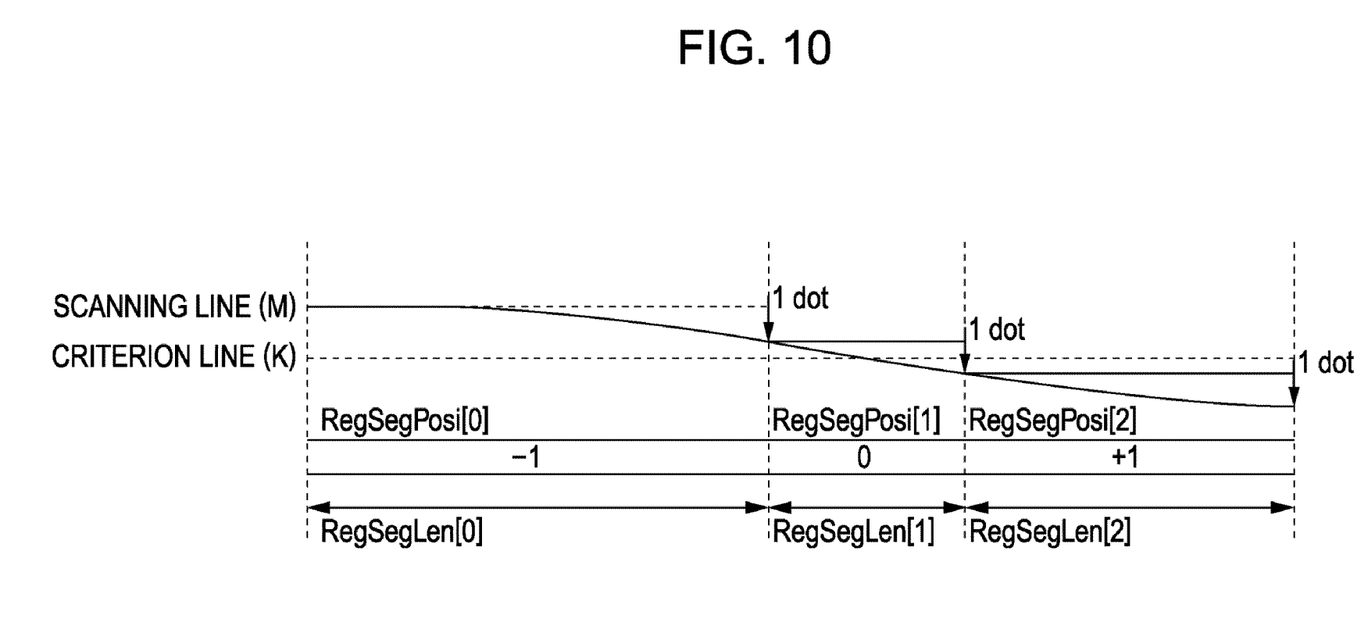
FIG. 10 is an illustration for explaining a method for specifying curve information concerning curving of the scanning line of laser light in the embodiment of the present invention.

FIG. 10 is an illustration for explaining a method for specifying the curvature of the scanning line for the image transformation processor 301 in the embodiment of the present invention. Herein, it is considered that one line of the bitmap data is divided into portions with respect to a main scanning position at which the one line is curved in the sub-scanning direction by an amount corresponding to the one line. Hereinafter, each of the portions that are obtained by division is referred to as a "segment". Furthermore, in a description given below, a name for a segment length and a name for curve information showing a shift amount, which is represented by the number of lines, of a shift of each segment from a criterion line, i.e., names with alphabets such as RegSegPos, indicate names of the register of the register portion 303. As described above, the CPU 208 writes values into the respective registers, thereby providing instructions for the process details to the image transformation processor 301.

A group of registers RegSegLen[i], in each of which a segment length is set, is provided in the register portion 303 of the image processing unit 205. A group of registers RegSegPos[i], in each of which a shift amount of a shift of a corresponding one of the segments from the criterion line is specified, is provided so that the desired number of registers RegSegPos[i] can be provided. Note that a register variable i (index) denotes the original number of each of the segments. Moreover, herein, the criterion line is provided as a criteria that is used to obtain a shift amount, which is represented by the number of lines, of a shift of the scanning line of laser light in the sub-scanning direction with respect to the main scanning position. The criterion line is located at an intermediate point between the maximum value of the curvature of the scanning line of laser light in the + direction and the maximum value in the − direction. When, for a particular color, trapping with only the other colors, such as black overprinting, is performed, the criterion line may be considered as a curved scanning line of laser light on the K plate.

Figure 11:
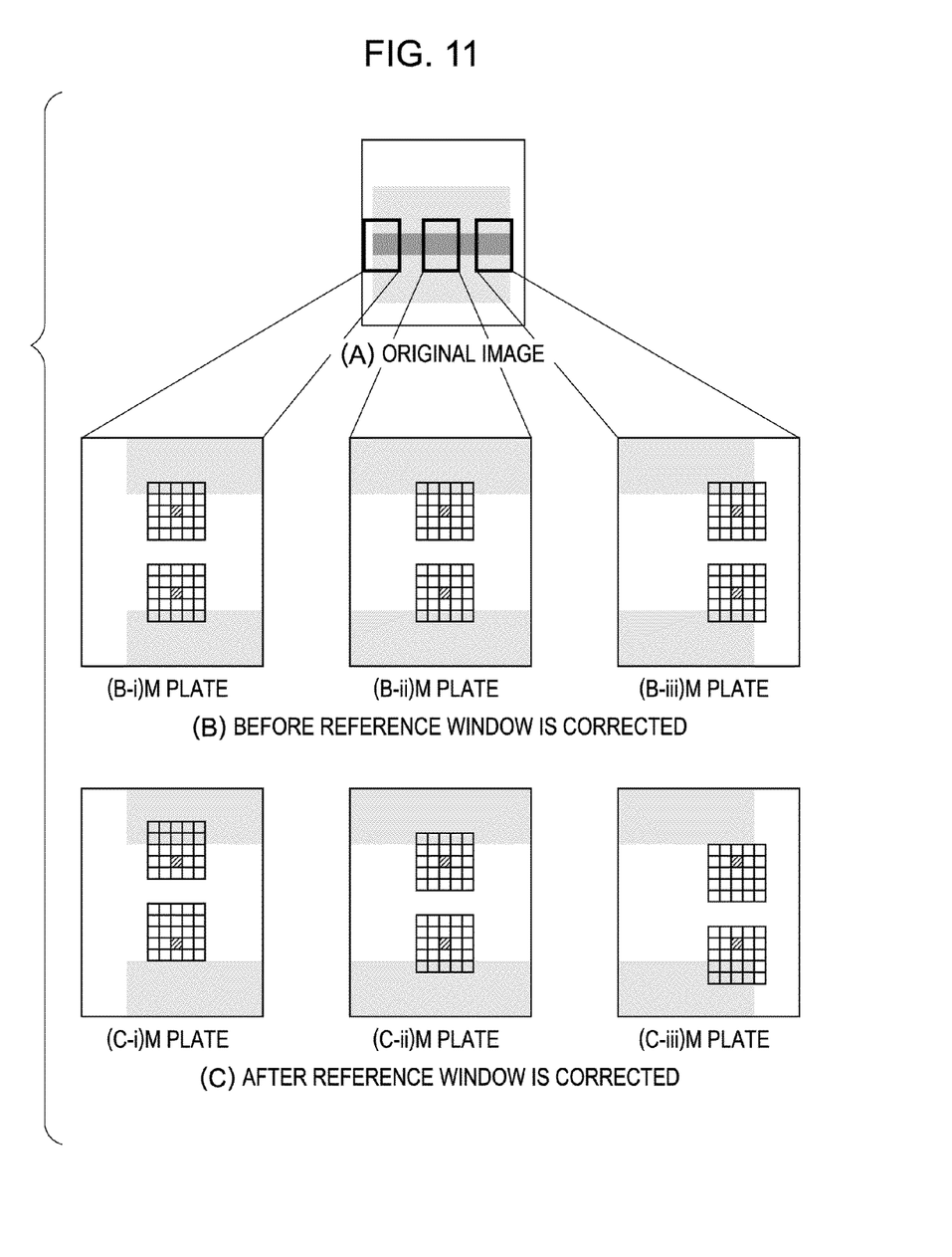
FIG. 11 includes illustrations for explaining correction of a reference window that is used in the trapping process in the embodiment of the present invention.
Figure 12:
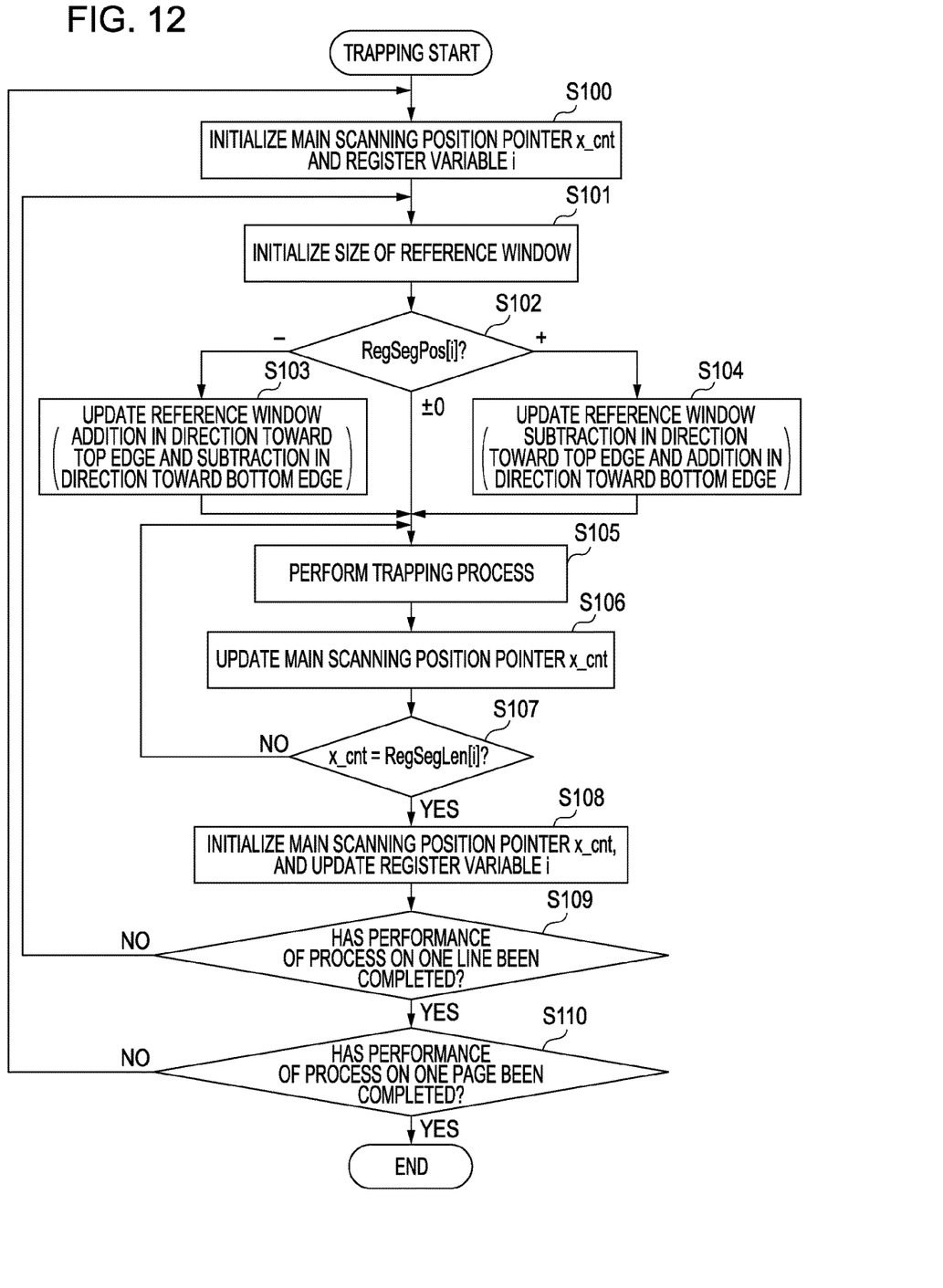
FIG. 12 is a flowchart for explaining an operation flow of the trapping process in the embodiment of the present invention.

FIG. 11 includes illustrations for explaining correction of the size of the reference window in the embodiment of the present invention. FIG. 12 is a flowchart for explaining the process that is performed by the image transformation processor 301 in the embodiment of the present invention. Note that, in a description given below, for simplicity of the description, for a name of each data or the like, a name of a corresponding one of the registers is substituted.

First, in step S100, when the bitmap data is input to the image transformation processor 301 from the image memory unit 204 in accordance with an instruction that is provided by the CPU 208, initialization in each line to be processed is performed. First, a main scanning position pointer x_cnt, which indicates the number of pixels that have been subjected to the trapping process, is initialized to be set to "zero". Additionally, the register variable i, which is used to select a register to be referred to from each of the groups of registers, is initialized to be set to "zero". In step S101, the size of the reference window that is necessary for the above-described trapping process is initialized. Note that, when the width of the reference window is initialized, the width of the reference window may be determined as a predetermined value, or may be determined using a value of a register (not illustrated) that exists in the register portion 303.

Next, the image transformation processor 301 proceeds to step S102. In step S102, the image transformation processor 301 determines a direction in which a segment is shifted from the criterion line with reference to a corresponding RegSegPos[i], in which a shift amount of a shift of the segment from the criterion line is set, i.e., in accordance with curve information. The image transformation processor 301 proceeds to a process of updating the reference window. When a result of determination is − (negative), the image transformation processor 301 proceeds to step S103. In step S103, the width of the reference window whose center is the target pixel is updated so that the width is increased by a value of the RegSegPos[i] in the direction toward the top edge and is decreased by the value of the RegSegPos[i] in the direction toward the bottom edge. When the result of determination is + (positive), the image transformation processor 301 proceeds to step S104. In step S104, the width of the reference window whose center is the target pixel is updated so that the width is decreased by the value of the RegSegPos[i] in the direction toward the top edge and is increased by the value of the RegSegPos[i] in the direction toward the bottom edge. When a result of determination is not − or +, the predetermined width of the reference window is not updated, and the image transformation processor 301 proceeds to step S105.

Note that, when updating of the width of the reference window is performed in step S102 or S103, a weight may be assigned to the RegSegPos[i]. For example, the width may be updated by +1 for +2 of the value of the RegSegPos[i].

In step S105, the above-described trapping process is performed. Herein, the reference window that is used in step S105 has shapes such as shapes shown in parts of (C-i), (C-ii), and (C-iii) of FIG. 11. Accordingly, for example, as shown in part (C-i) of FIG. 11, when the reference window that is updated by a large amount in the direction toward the top edge for the target pixel that is to be processed is used, there is a high probability that peripheral pixels having values which are equal to or higher than the threshold are found in the direction toward the top edge. As a result, the trapping width for downward growth is increased.

Next, because performance of the trapping process on one pixel is completed in step S105, the main scanning position pointer x_cnt is incremented by one in step S106, thereby updating the main scanning position pointer x_cnt. Next, a value of the updated main scanning position pointer x_cnt is compared with a value of the RegSegLen[i]. When the value of the updated main scanning position pointer x_cnt is not equal to the value of the RegSegLen[i], the image transformation processor 301 proceeds to step S105, and the trapping process is performed on the next pixel using the reference window having the same size. When the value of the updated main scanning position pointer x_cnt is equal to the value of the RegSegLen[i], the image transformation processor 301 proceeds to the subsequent step S108, and the main scanning position pointer x_cnt is initialized to be set to zero. Furthermore, the register variable i is incremented by one, thereby updating the register variable i. Next, in step S109, whether or not performance of the trapping process on one line has been completed is determined. When performance of the trapping process on one line has not been completed, the image transformation processor 301 proceeds to step S101. In this manner, the size of the reference window can be updated in accordance with the curvature of the scanning line of laser light for each of the lengths of the segments. Next, in step S110, whether performance of the trapping process on one page, i.e., on all lines of one page, has been completed is determined. When performance of the trapping process on one page has not been completed, the image transformation processor 301 proceeds to step S101, and the trapping process is performed on the next line.

As described above, the image transformation processor 301 generates a trapping image using the above-described process, thereby performing the process of transforming an image of a specified plate on the bitmap data corresponding to one page.

The image transformation processor 301 corrects the reference window, which is used to perform transformation (trapping), in accordance with the curve information concerning curving of leaser light that is influenced by mounting of a laser which scans an image for a specified color of the image. Distortion of the image that is influenced by mounting of the laser is compensated using a trapping region that is obtained as a result of trapping, whereby appearance of a white region or an unnecessary overlap between images can be prevented.

As described above, according to the embodiment of the present invention, even when curving of a scanning line occurs for each color, the curve information concerning curving of the scanning line of laser light is obtained, and the trapping widths for upward growth and downward growth can be adjusted with respect to the main scanning position in accordance with the curve information. Conventionally, a trapping process has been performed using trapping widths that are set to predetermined values in upward and downward, and left and right directions. Accordingly, when curving of a scanning line of laser light occurs in a printer engine, a white region has appeared, or a large number of unnecessary overlaps between toner images have appeared. As a result, this leads to reduction in print quality. In contrast, the above-described process in the present embodiment is performed, whereby the trapping process can be performed in accordance with curving of a scanning line of laser light. Accordingly, with the trapping process in the present embodiment, a white region or an unnecessary overlap between toner images, which are caused by a shift between plates, can be prevented as shown in FIG. 9.

Note that, the embodiment of the present invention may be applied to a system that is configured using a plurality of devices (for example, a host computer, an interface device, a reader, and a printer) or to an apparatus (for example, a copier, or a facsimile machine) that is configured using one device. The aim of the present invention can also be achieved by providing, to the system or the apparatus, a storage medium on which a program code the realizes functions of the above-described embodiment, and by reading and executing the program code, which is stored on the storage medium, with a computer of the system or the apparatus. In this case, the program code that is read from the storage medium realizes the functions of the above-described embodiment. Accordingly, the program code or the storage medium on which the program code is stored constitutes another embodiment of the present invention.

Furthermore, in another embodiment of the present invention, an OS, which operates on the computer, or the like may perform some of or all of practical processes in accordance with instructions of the program code, and the functions of the above-described embodiment may also be realized through the processes. Moreover, in another embodiment, the program code, which is read from the storage medium, may be written into a functionally expanded card that is inserted into the computer or be written into a memory that is included in a functionally expanded unit which is connected to the computer. In this case, a CPU which is included in the functionally expanded card or the functionally expanded unit or the like may perform some of or all of the practical processes in accordance with instructions of the written program code, and the functions of the above-described embodiment may also be realized through the processes.

According to any of the embodiments, the image forming apparatus that automatically corrects the reference window, i.e., the trapping widths for upward growth and downward growth, in accordance with curving of a scanning line, or the image forming method can be provided. Thus, a white region or an unnecessary overlap between toner images, which are caused by a shift between plates, can be prevented, and quality of a printed image can be improved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-165076 filed Jun. 24, 2008, which is hereby incorporated by reference herein in its entirety.

What is claimed is:

1. An image forming apparatus for forming an image using a plurality of toners, the image forming apparatus comprising:

a setting unit configured to set curve information in accordance with curving of a scanning line of laser light that occurs when an image is formed;

an image transformation processing unit configured to transform an image by generating a trapping image for preventing a white region from being generated at a boundary between two adjacent objects having different colors, the trapping image being generated by correcting a value of a target pixel on the basis of image data that is provided in a reference window having the target pixel and peripheral pixels; and a reference-window correction unit configured to correct the reference window for controlling widths of the trapping image in accordance with the curve information with respect to a main scanning position for pixels that are to be processed by the image transformation processing unit.

2. The image forming apparatus according to claim 1, wherein the image forming apparatus performs black overprinting or trapping.

3. The image forming apparatus according to claim 1, wherein, when the scanning line is divided into a plurality of segments, the curve information is information showing that each of the plurality of segments is a line which is shifted upward or downward from a criterion line used in an image transformation process.

4. An image forming method for forming an image using a plurality of toners, the image forming method comprising the steps of:

setting curve information in accordance with curving of a scanning line of laser light that occurs when an image is formed;

transforming an image by generating a trapping image for preventing a white region from being generated at a boundary between two adjacent objects having different colors, the trapping image being generated by correcting a value of a target pixel on the basis of image data that is provided in a reference window having the target pixel and peripheral pixels; and correcting the reference window for controlling widths of the trapping image in accordance with the curve information with respect to a main scanning position for pixels that are to be processed in a process of transforming a region having a color of the image.

* * * * *